United States Patent
Mansikkaniemi et al.

(10) Patent No.: US 7,721,210 B2
(45) Date of Patent: May 18, 2010

(54) ELECTRONIC CALENDAR SYSTEM

(75) Inventors: Tapio Mansikkaniemi, Espoo (FI);
Turkka Keinonen, Huhmari (FI); Harri Wikberg, Helsinki (FI); Natalia Boestad, Vikingstad (SE); Anne Koppinen, Tampere (FI); Anne Kirjavainen, Espoo (FI); Anna Valtonen, Helsinki (FI); Ritta Jokela, Rämsöö (FI); Petri Piippo, Karkkila (FI); Charlotta Willstedt, Linköping (SE); Marcus Davidsson, Linköping (SE); Otso Ylönen, Salo (FI)

(73) Assignee: Nokia Corporation (FI)

( * ) Notice: Subject to any disclaimer, the term of this patent is extended or adjusted under 35 U.S.C. 154(b) by 329 days.

(21) Appl. No.: 09/725,122

(22) Filed: Nov. 29, 2000

(65) Prior Publication Data

US 2002/0063732 A1    May 30, 2002

(51) Int. Cl.
*G06F 17/30* (2006.01)
*G09G 5/00* (2006.01)

(52) U.S. Cl. ................................. 715/733; 715/963

(58) Field of Classification Search ........... 345/767, 345/765, 864, 741–743, 745, 747, 854, 740, 345/823, 804, 805, 802, 817–820, 835; 709/206; 715/963, 864, 747, 734–737, 745, 733, 751–759, 715/965, 968, 802, 804, 805; 455/403, 410, 455/418

See application file for complete search history.

(56) References Cited

U.S. PATENT DOCUMENTS

| | | | | |
|---|---|---|---|---|
| 6,018,343 A | * | 1/2000 | Wang et al. | 715/733 |
| 6,049,776 A | * | 4/2000 | Donnelly et al. | 705/8 |
| 6,101,480 A | * | 8/2000 | Conmy et al. | 705/9 |
| 6,111,572 A | * | 8/2000 | Blair et al. | 715/703 |
| 6,167,379 A | * | 12/2000 | Dean et al. | 705/9 |
| 6,278,456 B1 | * | 8/2001 | Wang et al. | 715/700 |
| 6,369,840 B1 | * | 4/2002 | Barnett et al. | 715/853 |
| 6,389,278 B1 | * | 5/2002 | Singh | 455/414 |
| 6,417,874 B2 | * | 7/2002 | Bodnar | 345/854 |
| 6,442,693 B1 | * | 8/2002 | Sandgren et al. | 726/4 |
| 6,463,463 B1 | * | 10/2002 | Godfrey et al. | 709/206 |
| 6,466,236 B1 | * | 10/2002 | Pivowar et al. | 345/835 |
| 6,477,374 B1 | * | 11/2002 | Shaffer et al. | 455/445 |
| 6,785,868 B1 | * | 8/2004 | Raff | 715/530 |
| 6,823,373 B1 | * | 11/2004 | Pancha et al. | 709/219 |
| 6,865,605 B1 | * | 3/2005 | Soderberg et al. | 709/226 |
| 6,879,997 B1 | * | 4/2005 | Ketola et al. | 709/208 |
| 6,892,356 B2 | * | 5/2005 | Ishizaki et al. | 715/751 |
| 6,993,723 B1 | * | 1/2006 | Danielsen et al. | 715/751 |
| 2002/0023132 A1 | * | 2/2002 | Tornabene et al. | 709/205 |
| 2005/0192008 A1 | * | 9/2005 | Desai et al. | 455/435.2 |

* cited by examiner

*Primary Examiner*—Steven P Sax
(74) *Attorney, Agent, or Firm*—Banner & Witcoff, Ltd.

(57) ABSTRACT

A wireless system having a central family calendar. Individual family members may access the family calendar from their wireless devices. The system also includes telephone and address information for non-family members. Important dates such as birthdays, associated with the non-family members may automatically appear in the calendar. The system may be incorporated into other family accessible devices such as a family bulletin board.

51 Claims, 5 Drawing Sheets

FIG. 5 ically located calendar, the ability to share information is still limited, and the use of a single calendar also for individuals within the family is not easily provided. In addition, the use of such a calendar to interact with other family related devices is not available.

ELECTRONIC CALENDAR SYSTEM

RELATED APPLICATION(S)

This application is related to co-pending application Ser. No. 09/607,638, filed Jun. 30, 2000, entitled "Method and Apparatus for Touch Screen Input", Ser. No. 09/659,416, filed Sep. 11, 2000, entitled "Network with Mobile Terminals as Browsers having wireless access to the Internet and Method for Using the Same" and continuing application of the previous having Ser. No. 09/607,637 filed on Sep. 11, 2000 and Ser. No. 09/609,581 filed Jun. 30, 2000 entitled "Network with Mobile Terminals Having Wireless Access to the Internet and Method for Using Same" and Ser. No. 09/607,369 filed Jun. 30, 2000 entitled "User Interface Constructed from Components Created from Set of TAGs" and Serial NO. U.S. Ser. No. 09/608,174 filed Jun. 30, 2000 entitled "Handheld Terminal with Multiple Scrolling Means" and Ser. No. 09/607,359 filed Jun. 30, 2000 entitled "System and Method for Providing a Virtual Keyboard for a Wireless Terminal". This application is also related to Ser. No. 09/671,238, filed Sep. 18, 2000, Ser. No. 09/714,939, filed Nov. 20, 2000, and Ser. No. 09/725,249, filed Nov. 29, 2000. These are all assigned to and commonly owned by Nokia Corporation and are herein incorporated by reference.

BACKGROUND OF THE INVENTION

1. Field of the Invention

This invention relates generally to a calendar shared between family members and, more particularly, to a calendar which can be accessed from wireless devices by members of the family.

2. Discussion of the Prior Art

Since members of present day families have active lives outside the family, they often have schedules beyond family events, and it is desirable that some kind of common listing of various activities of the family members be available for planning purposes. One of the simplest methods of doing this in the past has been taking a paper calendar and posting it in a common area of the household so that various scheduled events can be listed together. While such a system is convenient in terms of simplicity of use and easy scanning, there are some drawbacks to this type of system. In particular, in order to access this system, it is necessary to physically be present at its location. Thus, it is impossible for a family member to obtain information about events unless he or she is at home and in front of the calendar. Also, there is some difficulty for recurring events in that they must be entered manually a number of times. While this system is very workable, these drawbacks make it less convenient for family members who are away from home most of the day.

A more recent suggestion for an electronic calendar is described in U.S. Pat. No. 6,018,343, which uses a web based system so that individual calendars can be accessed from their own computers. However, this does not provide a system which is easily shared among multiple users of the same family. Also, it is still necessary for a user to be at his or her computer in order to utilize this system.

Another recent development is referred to as the "Ericsson Air Calendar". This system utilizes a wireless telephone to allow access to calendar information on the web or on a corporate network. This system utilizes synchronization between the phone and the air calendar server. The desired access to one users calendar may be granted to other users to facilitate scheduling.

SUMMARY OF THE INVENTION

Accordingly, the present invention provides a calendar system which may be accessed by wireless devices from several family members.

The present invention also provides a wireless calendar system which allows access by different members of a family to a common calendar.

The present invention further provides a family calendar system which is accessed by wireless units and which Iso interacts with other family devices such as message boards and address lists.

The present invention still further provides a family calendar which is accessed by wireless devices and which is part of a family information system.

The present invention also provides a wireless family calendar having month, week and day displays, with the Month display being linear.

These advantages are achieved by providing a central server, which is wirelessly connected to terminals and which stores both individual and family calendars. Other family information, such as information about friends, may also be stored and may interact with the calendar. Events are easily added or modified by using a terminal of the system authorized to access to family calendar services.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
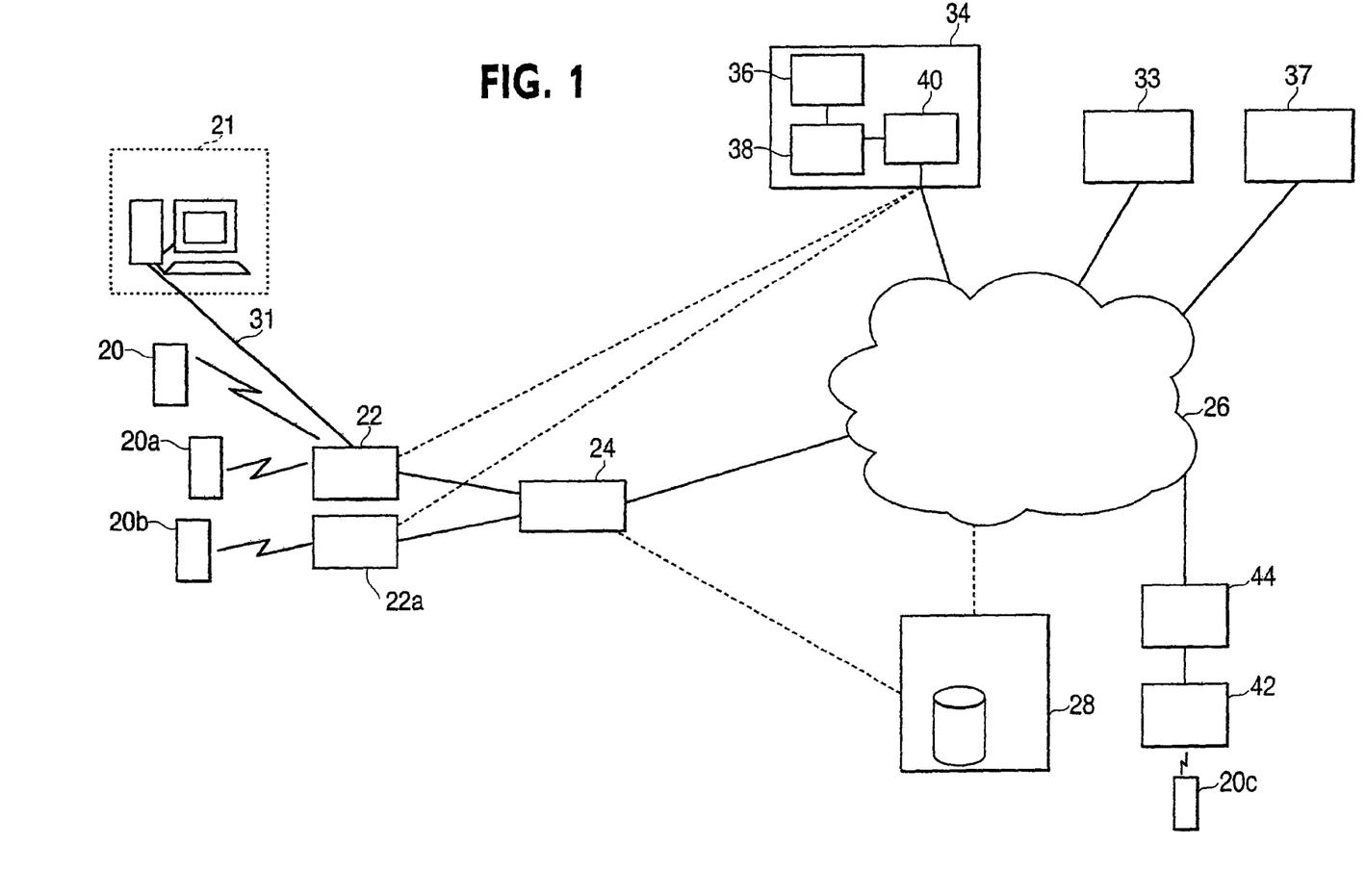
FIG. 1 shows the overall system of the present invention.

Referring now to the drawings, wherein like reference numerals designate identical or corresponding parts throughout the several views, and more particularly to FIG. 1, wherein one example of the invention is the system 10 which includes terminals 20, 20a, 20b, each coupled over a wireless system to an access point 22, 22a. The access points 22, 22a are coupled to network, which is owned, for example, by an operator such as an Internet service provider 24 and which is coupled to the Internet 26. In addition, the network such as Internet service provider 24 is coupled to a mobile display appliance server 28 that provides the users with specific services and features through their wireless terminals 20, 20a, 20b. Alternatively, the access point 22 can be connected directly to server 28 via any network connection.

It is also possible that a terminal 20c outside the service area of access point 22 may be connected to server 28 by instead being in the vicinity of another access point 42 which then is connected to server 28 through, for example Internet service provider 44 and the Internet or other network.

The access point 22 is also coupled to a global unit or product vendor 34. The address of a global address registry 36 within global unit 34 is known by the terminals 20, 20*a*, 20*b*. A direct connection is established between terminal via a network access point or server of Internet Service Provider 24. According to one alternative addressing scheme to this chosen exemplary system of the invention, an address of server 28 is received by the terminal and the network node from which the request to global register was made. After the terminal has knowledge of the address of the server 28, a direct link can be made from the terminal to the server. The internet address of global unit 34 with the global address register 36 is permanently contained in the memory of each terminal 20, 20*a*, 20*b*, 20*c*. The global address registry 36 is a place from which all the terminals may fetch Internet addresses through their respective remote server. The initial configuration information and or the configuration of a direct link is loaded down to the terminal from the remote server to the terminal where it is stored as part of the configuration information. This information can be updated from, for example, the Internet service provider 24, access service provider or mobile access provider from time to time. The configuration and the addressing of the terminal in the system, as well as any direct address link configured to the terminal user interface, is also updated down to a remote server when it is changed. The global unit 34 includes a global address server 36 and a global upgrade server 38. The vendor of the system terminal is connected either directly via a network, for example the Internet, to each remote server 28 or is connected in a more centralized way first to the server of the terminal vendor and from there onto each server 28. The advantage of having the terminals store the Internet address of the global address server 36 is that if the terminal 20 is relocated near another access point, then the terminal 20 may still obtain the Internet access location of server 28 simply by knowing the Internet address of the global address server 36. It would also be possible to instead have a system where the address of the server 28 is stored in the terminal 20 and the memory is updated as needed. The server 28 authenticates, using the unique identity of the terminal 20, that the terminal 20 has shared or group access privileges. Accordingly, the terminal 20 is authenticated and logged onto the server 28 to begin a shared session at a shared or group level.

After the terminal has been authenticated and the terminal has received the downloaded configuration information of services, user interface and links configured concerning the services and the main view of the user interface of the terminal, which is a part of the downloaded information to the terminal, the terminal is ready to be used. Then each terminal includes a unique identification (ID). The IDs are reserved and used by members belonging to the same group. Each of the unique identifications of the terminals is recognized in the same server 28 to be used by the members of the group. Every member belonging to the respective group may use the same terminal. When one or more terminals exist including a unique terminal identification is switched on, then each terminal belonging to the same group requests from the global address server 36 a unique terminal identification. Then each of the terminals belonging to the same group will obtain the address of the same server 28 to which each of the terminals is connected. Thus, the user can now access services or retrieve information from the server 28 or the Internet 26.

In addition to the terminal being used to access and use the services of the group, the terminal can be used to access services of an individual user. In order for the user to initiate an individual Session and retrieve individual information, the user must use the terminal 20 and provide further authentication to the server 28 to gain access at the individual level. As would be appreciated by one of ordinary skill in the art, either at the shared/group or at the individual level, the user is able to the retrieve the information related to the group of users as well as to browse the Internet 26 to retrieve information.

The mobile terminal to be used can be an ordinary PC and a wireless modem configured to establish a wireless connection via a mobile service operator to the server 28 having capability to be in connection to the network. A mobile terminal can be such a terminal is described in detail in any of the copending U.S. patent application Ser. Nos. 09/607,637, 09/659,416 or 09/609,581.

Figure 2:
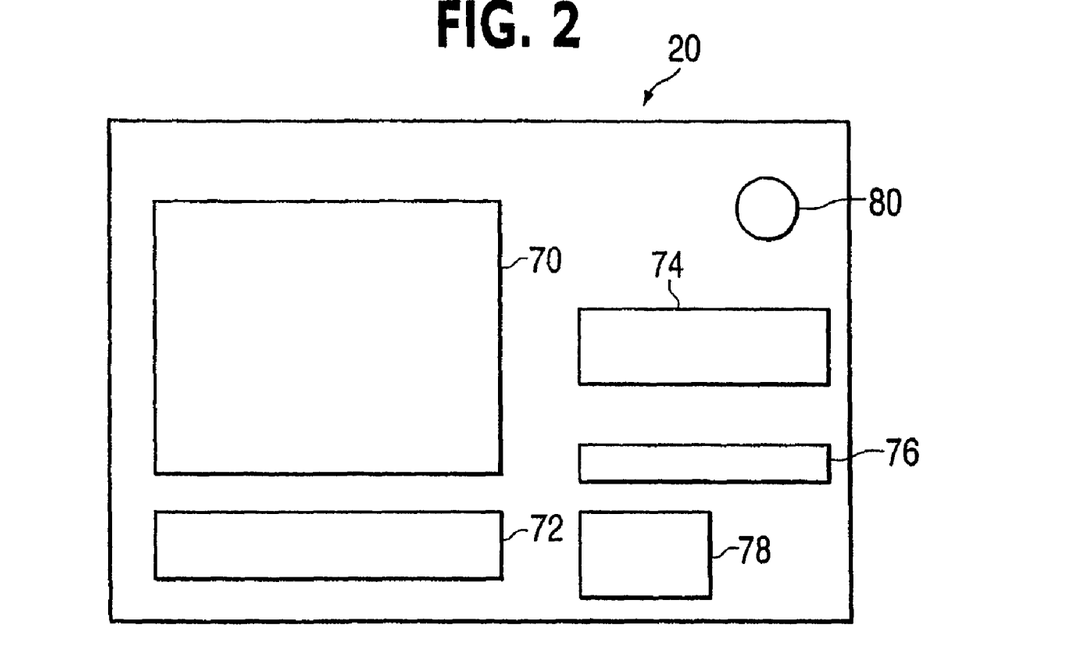
FIG. 2 shows a terminal of a system.

FIG. 2 is a more detailed block diagram of a terminal, which shows the calendar application of the invention operating within the system shown in FIG. 1 when the terminal is used in such a way that a calendar application is selected as at the time as the service. Referring to FIG. 2, the terminal 20 includes a display 70, a user interface (UI) framework 72, a browser 74, a driver 76, and processor 78. Each element is shown here for reference only, and the location of each element is not intended to be a defined location of one element relative to the other elements. For example, the user interface 72 may be located in the display, as a part of the display, or independent of the display.

When the user accesses a service like a calendar service or retrieves information from the server 28, the browser 74 (in FIG. 2) is the program product that is in charged to convey the service specific information and the main view of the selected application service such as calendar service from the server 28 (of FIG. 1) to the terminal 20 (of FIGS. 1 and 2).

Figure 3:
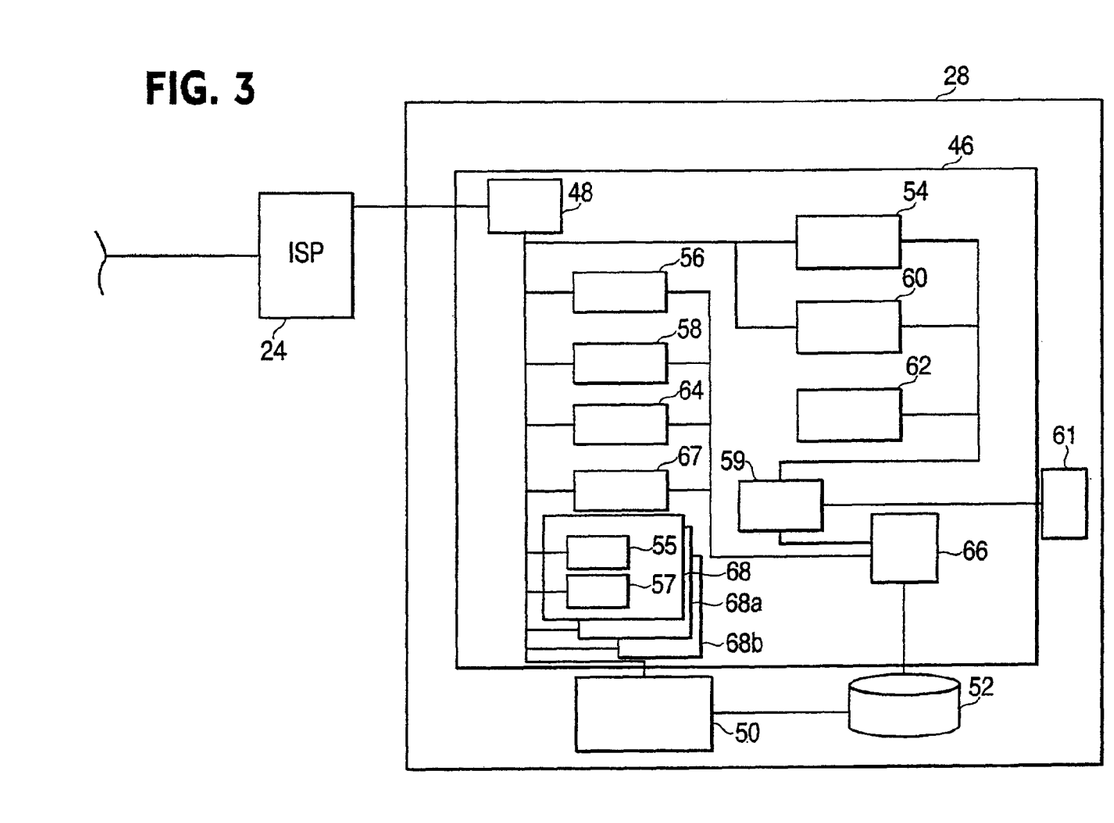
FIG. 3 shows a server of a system.

FIG. 3 is a more detailed block diagram representation of the server 28 of the system of the network shown in FIG. 1. In FIG. 3, the server 28 includes a support server 46, a response handler or application server 48, a network application server 50, and a directory server 52. As would be appreciated by one of ordinary skill in the art, the referenced connections do not depict the physical connections between the elements but merely logical connections. The support server 46 provides services oriented towards enabling and supporting the services provided to the terminal 20. The support server 46 includes an upgrade service unit 54, a bookmark service database unit 55, a login services unit 56, a bookmark database 57, a profile services unit 58, a client log unit 59 for collecting information about clients, an advertisement services unit 60, a system log unit 61 for collecting information about events in the server 28 from the client log unit 59, an administrative services unit 62, a defined services unit 64, and a directory client unit 66.

Still referring to FIG. 3, the upgrade services unit 54 is dedicated to controlled software upgrade of the software for the support server 46. Updates are transmitted from the global upgrade Server 38 (in FIG. 1) to the upgrade service unit 54. The login services unit 56 provides for authentication of the user and the terminal 20 that is being used to access the services based on information provided by the client unit 66. Additionally, the login services unit 56 is also responsible for log-off activities, such as individual session termination. The profile services unit 58 provides for modifying a user's profile information. This modification of a user's profile may include modifying the group and individual information and preferences. The administration services unit 62 provides for administration of the support server 46 and the application server 48. The software product updates are transmitted from the global upgrade server 38 (in FIG. 1) and its configuration tool manager to the upgrade service unit 54 in FIG. 3 and its configuration tool client. The configuration tool client is the function unit that acts when any configuration tool manager 38 (in FIG. 1) of management server 37 (in FIG. 1) upgrades any software component, full executable software program or re-configures configuration parameters, application and system parameters.

In FIG. 1 a firewall 40 is protecting the connection to and from the global unit 34. It will be apparent to those skilled in the art that the firewall unit 40 functions to provide secured access to the global address server 36 and the global upgrade server 38. In FIG. 3, the advertisement services unit 60 provides for the server 28 to tailor advertisements to the user and the terminal 20 according to the user's profile information. The defined services unit 64 is a classification of "other services" containing items such as bookmark management services, help services, log services, name management services, and general management services. The directory client unit 66 is coupled to the directory server 52 to provide client verification.

In FIG. 3. the remote register management and control unit 67, that knows the closest or the global terminal validation register address, may also interpret the answer received from this register. Typically, in the terminal in the browser login action, the server 28 browser client specific parameters 68 are managed individually. The management information of one terminal browser session is stored and used when request is received from an identified terminal 20. Other requests received from terminals (20a or 20b) processing different identification information (IDs) will use browser client specific parameters (68a, 68b) and may result in, for instance, seeking of bookmarks for the terminal when the action request originated from that terminal.

In FIG. 1. the terminal 20, 20a, 20b, 20c may have access through proper authentication and service purchases to third party publications available from a vendor 33, such as news related information found in magazine publications or the daily newspaper.

The user interface of the terminal 20 (of FIG. 1) offers the user alternative selections means to select commands and a target to the command in the main menu of the terminal view or in an application such as a calendar that is used at a time.

The marker or selection means that the user can use is one of the means in the following list: an external mouse that is connected to the terminal, an external keypad that is connected to the terminal, a visual and a virtual keypad that is displayed to the touch sensitive screen (and described in detail in the cross referenced U.S. patent application Ser. No. 09/607,359), a direct manipulation selection arrangement made with fingertips or for example a pen to touch sensitive screen user interface selections (as described in detail in U.S. patent application Ser. No. 09/607,638), an integrated roller(s) in the terminal and roller control buttons (as described in detail in a cross referenced U.S. patent application Ser. No. 09/607,359).

When the external mouse is used for marking the target into which the user's commands are to be directed, marking the target of the command is done typically by pressing one button once (the left most button). Then an application specific command is typically selected from a menu (like an Edit menu) and then the selected command affects the previously marked target of the command. This basic mouse selection pattern is currently known in any PC.

When an external keypad is used, the marking or selection concerning the target of the selected command may be done by moving the active selection point up, down, left or right with the "arrow buttons". The actual selection or marking is then done by pressing the <enter> button. Also as an alternative to moving the active marking with "arrow buttons" (->, <-, . . . ) the marking point can be moved, for instance, by pressing the "tab" button, and the user interface of the application may move the active marking position from one target to another in such a way that all the possible targets in one view, one at a time, are available to be selected. Then the command that is to be processed for the selected target is typically given by pressing some button control, like for instance <ctrl> button and, at the same time a character button (like "W") or two concatenation character button pressings (like "W" and "O", the first character defining the menu set and the second the command in that menu set, or the first character defining the command and the second target to which the response is directed for example. save to memory). This kind of marking and selection is known at present in any PC user interface.

When the virtual keypad is used for the marking or selection, marking the target and giving a command may be done similarly as above described for the external keypad case, but instead of using "arrow buttons" or "tabs" to select or mark the target and character or function buttons to give certain commands to selected target, the user may do the keypad button selection with his fingertips directly to display "the soft keys". The soft keys are the keypad buttons drawn on the touch sensitive display to look like had button keys of the keypad. The virtual keypad means and methods are currently presented in at cross-referenced U.S. patent application Ser. No. 09/607,359.

When direct manipulation selection is used, the application that is used can be controlled from the user interface by the user first selecting the target by directly touching the target area in the touch sensitive display. In the next step a menu of commands or a command button is selected (from the view if presented at the moment), and in the third step the given command is processed for the selected object. Possibly a status indication of the processed command is shown in the display of the user interface. The direct manipulation methods are presented in U.S. patent application Ser. No. 09/607,638. The terminal 20 (in FIG. 1) user issues commands to the terminal 20 and the server 28 by using direct manipulation and from menu-type of UI controls (object menu, toolbar etc.). The user either presses the hardware or software button down, keeps a finger on the hardware or software button for a longer period, moves the finger over the touch-sensitive touch screen and lifts the finger from the hardware or software buttons. All of these basic user interactions—or basic user events—need to be detected by the hardware and software. Hardware hand software buttons are therefore at the particular software level considered identical. From a user interaction point of view they are to be considered to be identical.

Depending on the used service application and the user given selection and command from the terminal interface, the given command may affect the application content information of the service used by the group members. The authenticated group member may change the group calendar content according to a given command in such a way that other authorized members of the same group get the latest group calendar information from the server 28.

As noted in U.S. patent application Ser. No. 09/725,249, when this system is actuated from a wireless device, the first view is of a bulletin board containing messages for members of the group, which is also known as a family. Other tabs are available for displaying other functions of this system. In particular, the third tab, indicated by a calendar, is actuated to show the calendar feature. Of course, the system may have only the calendar function if preferred, or may be set so that the calendar function is displayed when first actuated.

Figure 4:
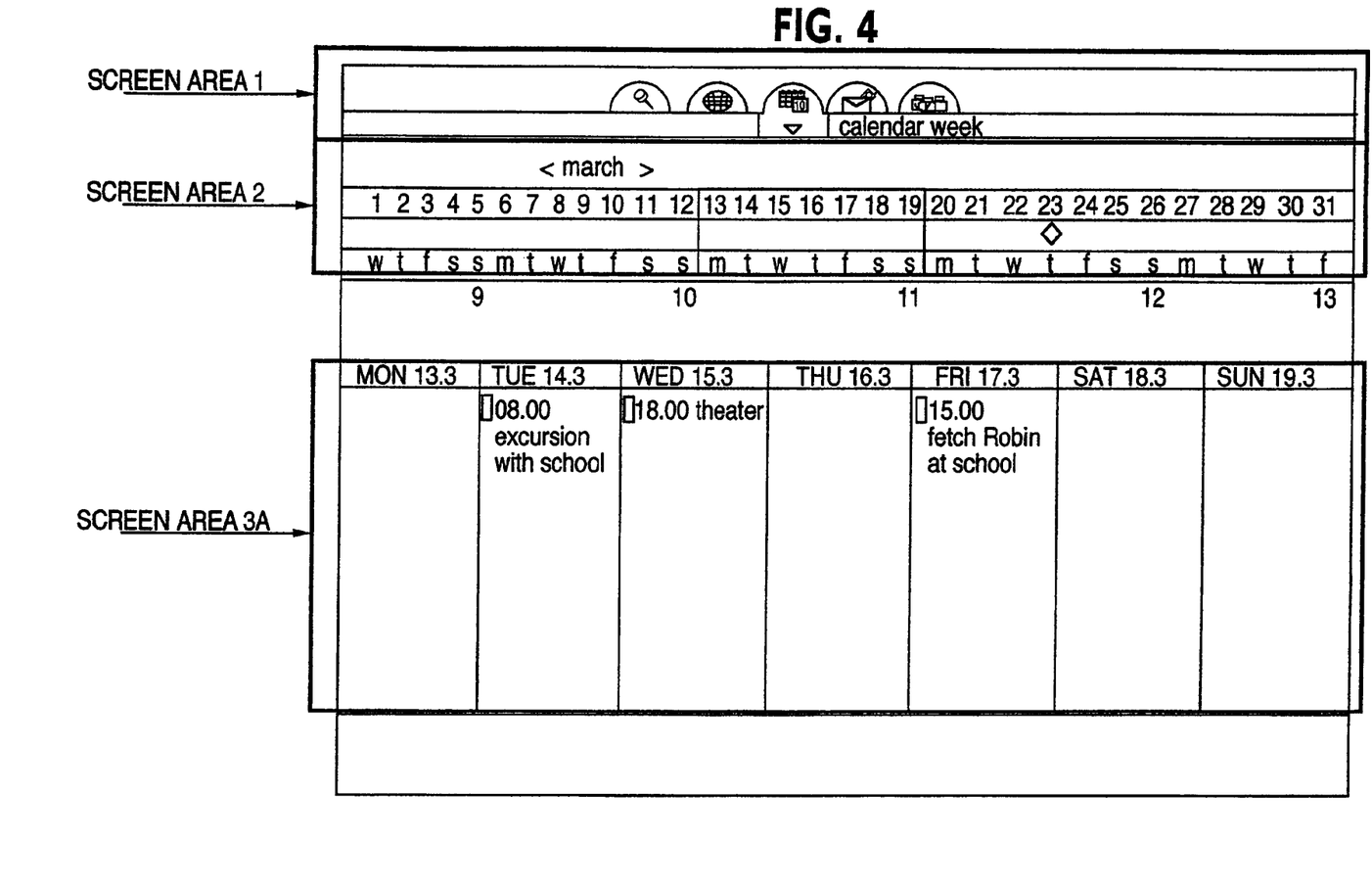
FIG. 4 depicts a display of a week of the calendar of the present invention in which screen areas are identified.
Figure 5:
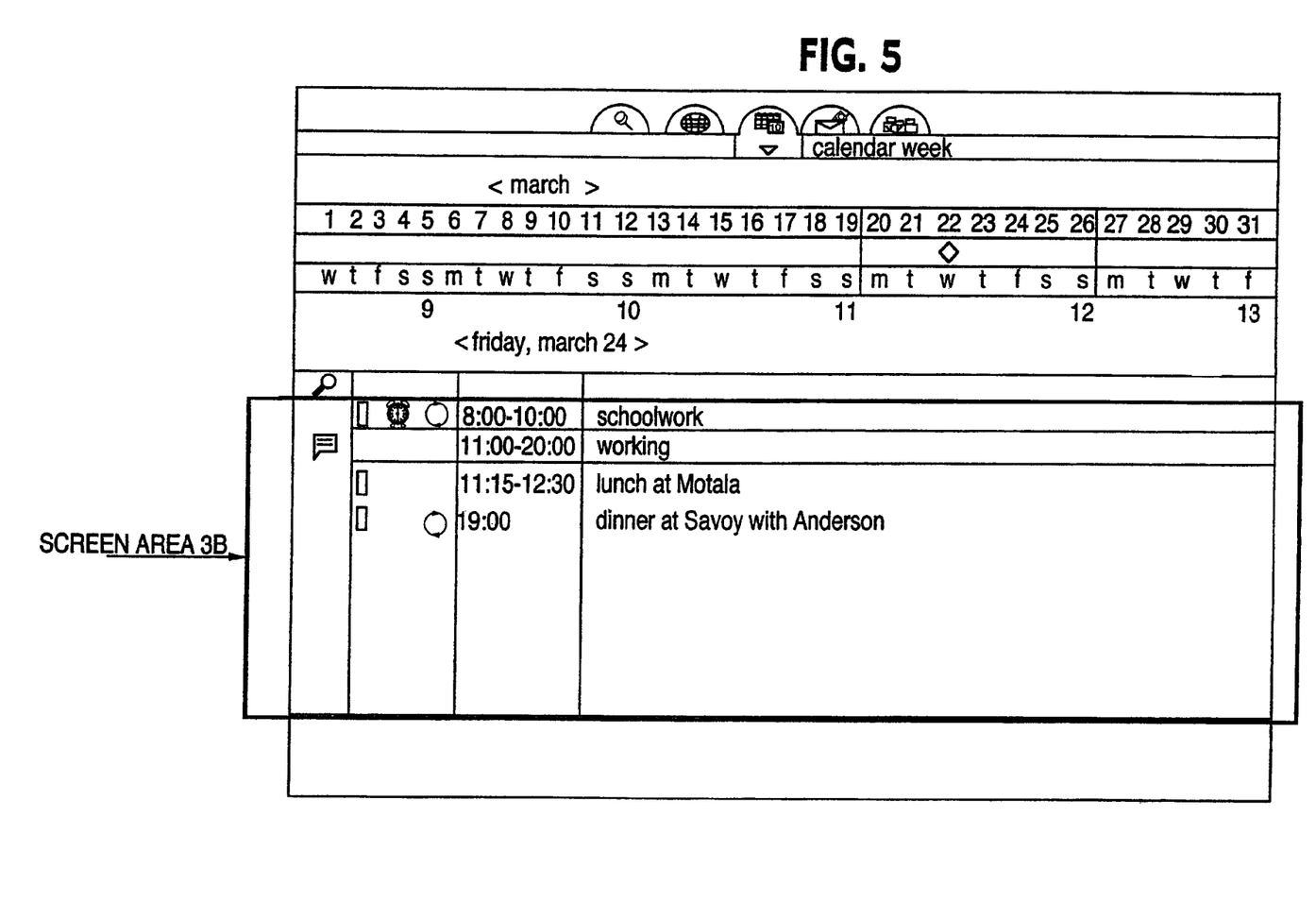
FIG. 5 depicts a display of a day in the calendar of the present invention in which detailed screen area is identified.

FIG. 4 shows the week view display generated when the calendar is actuated. However the calendar application may be configured alternatively to show first another view like for example a monthly view. The top section of the display is another screen area than the week view or the initial calendar view area. The other view area (the screen area 2) can be a month frame which lists for example the name of the month and displays in a linear fashion, or ruler presentation, the days of the month in a line. The frame does not tie the technical implementation to certain user interface software architecture that is composed of frames like in MSWindows™, but instead the example of the interface of a calendar week view presented in FIG. 4 looks like view areas of an essentially rectangular notice. In the month ruler presentation, the days of the week corresponding to each date are also indicated immediately below the number. A week designation may also be displayed at the beginning of each week. Thus, it is common in many countries to number the weeks of the year and this is so indicated. Forward and backward arrows are also included near the month name which, when actuated, produce a display of the previous or succeeding month. If actuated repeatedly, months in the previous or succeeding year will also appear.

Beneath the month display are seven column displays, which are shown in FIG. 4 in a week view in such a way that certain screen areas are marked (in the screen area in FIG. 4) for indicating the current week and the activities for the days of that week. A different week can also be displayed by selecting that week in the month frame (the screen area in FIG. 4). However, the current week will always be the default setting. Each of the seven columns represents the schedule for one day of the week.

By selecting one of the seven Columns, the display will be changed to a day view as shown in (FIGS. 4, 5, 6 and 7. As shown in this FIG. 5. The month arrangement will remain at the top of the view, along with the tab indicators. (In FIG. 6 is presented a day view of the calendar.) FIG. 6 shows a day view of the calendar in which a certain screen area is marked in detail. However, in the day view the lower section (the screen area in FIG. 5) will be arranged to list in order the events for that day, in a similar fashion to the week display (in FIG. 5), but with more space being allowed for comments and explanations. The actual times may be present in the daily display (in the so-called day view in FIG. 5) that would not normally be shown in the weekly display (in the week view in FIG. 4). A color coding may be used in both the daily (in the day view) and weekly (in the week view) displays if so indicated when the event is input. A color coding may be used to indicate events for different members of the family, relative importance of the event or type of event.

New calendar events are created in a certain standard way (in a same and pre-defined way) from a service menu. The user of the terminal first selects a particular day and then a new calendar event view is shown in the display. A virtual keyboard is shown so that the new event can be typed and other information regarding its occurrence can also be determined. It is also possible to modify any event already in the agenda by clicking on that particular event. If an external keyboard is connected to the terminal, the information can be typed by using it instead of the virtual keyboard.

Additionally the input interface enables direct manipulation of the visual representations of the calendar events. The user is able to create and edit events in the same views of the system where the information is presented.

Each day's events are sorted according to time if desired. Events that have no specific start time are displayed on top. It is also possible to instead sort the events by type or alphabetically. According to user interface style definition of the terminal interface of the system, there is always one-day event row selected. When an object (the target to be given command) is selected, in the user interface is shown an object menu symbol, from which the user can select commands that affect the selected object (the target of the given command). The user of the terminal may select different objects (the targets), use different selection markers (for example, like an external mouse, integrated rollers to the terminal and its control keys, direct manipulation means, external or virtual keyboard) and follow the present selection visually in the user interface display. When a new calendar event is entered, both the start and end times are specified. In addition, it is possible to select a color to mark the calendar event. If a color is not selected, a default color is used which can be keyed to the particular user, or other defaults may be set.

Each new event is also designated to either be listed on the family calendar or just on the individual's calendar. Thus, any member of the family can look at and add to the family calendar and also look at and add to their private calendar, but cannot look at and add to another's private calendar.

The starting and ending times may be entered in different formats as predefined by the user. Thus, the use of a.m. and p.m. may be selected or military time. A colon or a period may be used between hours and minutes. Initial zeros may be suppressed or not, as can ending double zeros. Default settings for beginning of the day may be 8:00 or other times and ending times may be 8:30 p.m. An event may be indicated as being an all day event if desired.

An event may also be indicated as a reminder. That is, if selected, a reminder is placed on the family notice hoard (in note format at the appropriate time). The beginning and ending time that the note should be displayed may be set in terms of hour, days, months, etc. If the event will occur more than once, a recurrence button may be pressed and the number of days or weeks that it will reoccur is indicated. In doing so, it is only necessary to type up the event once and it will then be copied the requisite number of times. All fields in a new event—dialog (the new event editing display view section in the user interface), contain default values in such a way that in the simplest method the user enters information by selecting the day and writing the description of the event (the content). Although the term family has been used above in the traditional sense of a nuclear family living together, it is also possible for the system to operate for a number of people who share quarters but are otherwise unrelated. It would also be possible to utilize such a system for any other grouping of people having a common business or hobby interest.

Another function available to this wireless system is the storage of personal information. This information may be viewed by touching the tab on the right in the main view of the display. This tab is indicated by a drawing or an image of several people. For each person listed, it is possible to gather at one place appropriate information regarding that person. This would include name, address, phone number, email address and possibly other data such as birth date.

It would also be possible to list more information for a group of a people. The information in the group would then include individuals which could be listed separately.

When a new person is to be added to the listing, a new contact card is created when the user pushes a "new card"-button. The information regarding that person is then entered into the various fields. The information may include more than one phone number, email address or actual address if the person has both a work and home phone or a summer and winter residence. Various other pieces of information may also be added such as a birthday or other appropriate date. When a new person is added, a button, which indicates that the person belongs to a group (that is for instance another user group called a family or a club) can be pressed in order to bring up a listing of different groups. The appropriate groups are then indicated and that person would be automatically added to those groups. When a birthday or other day is indicated, it is possible to indicate whether this day should be displayed on the calendar application on a regular basis. Similarly from any other application from the system can be brought event(s) to the calendar application. From the calendar application when a certain predefined rule expires like advanced defined time to do something (like a week time to do anything necessary according to the content of an event) a certain defined time like a birthday, or an event is created in another application of the system, for instance, the notice board.

Once this information is placed in storage, the indicated dates will appear on the calendar in a standard fashion. In addition, if messages are being sent to listed people, it is possible to rely on this information to obtain the appropriate address or telephone number. For example, if a reminder is placed on the calendar and this reminder relates to sending a message to someone outside the family, the call can be made using the information stored in relation to each person.

Thus, this arrangement not only makes it possible to store information concerning outsiders in the same fashion as a traditional telephone list, but it allows interaction between the listings of outside people and the calendar in order to list important dates and also allows for interaction with the message board for placing calls.

Instead of using the system terminal as the user terminal, it is also possible, that the user may be connected to the server 28 (in FIG. 1) of the group by using an ordinary PC and modem 21 connected to the network by a wired or wireless network 31.

Numerous additional modifications and variations of the present invention are possible in light of the above teachings. It is, therefore, to be understood that within the scope of the appended claims, the invention may be practiced otherwise than as specifically described herein.

We claim:

1. An apparatus comprising:
   a processor configured to communicate with a plurality of wireless devices operable to belong to a group, the processor configured to perform:
   receiving calendar information from one or more of the plurality of wireless devices, the calendar information comprising one or more calendar events from a first wireless device of the group and one or more private calendar events from the first wireless device of the group;
   maintaining a group calendar comprising the one or more calendar events and one or more additional calendar events from one or more wireless devices of the group;
   providing access to the group calendar to the plurality of wireless devices of the group;
   maintaining an individual calendar corresponding to the first wireless device of the group, the individual calendar comprising the one or more calendar events, the one or more additional calendar events, and the one or more private calendar events;
   providing access to the individual calendar only to the first wireless device of the group; and
   transmitting a signal to the first wireless device associated with a graphical user interface, wherein the signal is configured to cause the graphical user interface to display each additional calendar event marked with a graphical indicator corresponding to the wireless device from which the calendar event was received, and to display each calendar event and each private calendar event marked with a graphical indicator corresponding to the first wireless device.

2. The apparatus of claim 1, wherein the processor is further configured to perform:
   providing equal access to each of the plurality of wireless devices to modify the group calendar.

3. The apparatus of claim 1, wherein the processor is configured for communication with the plurality of wireless devices through communication with an access point in communication with the plurality of wireless devices.

4. The apparatus of claim 1, wherein the processor is further configured to perform:
   authenticating the first wireless device prior to providing access to the individual calendar.

5. The apparatus of claim 1, wherein the processor is further configured to perform:
   receiving calendar information from the plurality of wireless devices, the calendar information comprising one or more calendar events from each wireless device of the group;
   maintaining the group calendar so as to include the calendar events from all wireless devices of the group and so as to exclude the one or more private calendar events from the first wireless device; and
   maintaining the individual calendar comprising the one or more calendar events from all wireless devices of the group and the one or more private calendar events from the first wireless device.

6. The apparatus of claim 5, wherein the calendar information from the plurality of wireless devices further comprises one or more private calendar events from each wireless device of the group, and wherein the processor is further configured to perform:
   maintaining a plurality of individual calendars, each individual calendar corresponding to one wireless device of the group, wherein each individual calendar comprises the calendar events from all wireless devices of the group and the one or more private calendar events from the corresponding wireless device; and
   providing access to each individual calendar only to the corresponding wireless device.

7. The apparatus of claim 5, wherein the processor is further configured to perform:
   providing equal access to each of the plurality of wireless devices to modify the group calendar.

8. The apparatus of claim 7, wherein the processor is further configured to perform:
   authenticating each wireless device prior to providing access to each individual calendar.

9. The apparatus of claim 1, wherein the apparatus contains information of a valid identifier of each wireless device enabling service and a configuration tool configured for managing at least some configurable controlling functions of a browser from the wireless device.

10. The apparatus of claim 1, wherein the processor is further configured to perform:
    receiving, from one of the wireless devices, a command to modify content of the group calendar;
    modifying the group calendar according to the command; and providing access to the modified group calendar to the plurality of wireless devices.

11. The apparatus of claim 1, wherein the processor is further configured to perform:

providing access only to the first wireless device to modify the individual calendar.

12. A method comprising:

receiving calendar information from one or more of a plurality of wireless devices, the plurality of wireless devices operable to belong to a group, the calendar information comprising one or more calendar events from a first wireless device of the group and one or more private calendar events from the first wireless device of the group;

maintaining a group calendar comprising the one or more calendar events and one or more additional calendar events from one or more wireless devices of the group;

providing access to the group calendar to the plurality of wireless devices of the group;

maintaining an individual calendar corresponding to the first wireless device of the group, the individual calendar comprising the one or more calendar events, the one or more additional calendar events, and the one or more private calendar events;

providing access to the individual calendar only to the first wireless device of the group; and transmitting a signal to the first wireless device associated with a graphical user interface, wherein the signal is configured to cause the graphical user interface to display each additional calendar event marked with a graphical indicator corresponding to the wireless device from which the calendar event was received, and to display each calendar event and each private calendar event marked with a graphical indicator corresponding to the first wireless device.

13. The method of claim 12, further comprising:

providing equal access to each of the plurality of wireless devices to modify the group calendar.

14. The method of claim 12, wherein the calendar information is received by communication with the plurality of wireless devices through an access point in communication with the plurality of wireless devices.

15. The method of claim 12, further comprising:

authenticating the first wireless device prior to providing access to the individual calendar.

16. The method of claim 12, further comprising:

receiving calendar information from the plurality of wireless devices, the calendar information comprising one or more calendar events from each wireless device of the group;

maintaining the group calendar so as to include the calendar events from all wireless devices of the group and so as to exclude the one or more private calendar events from the first wireless device; and maintaining the individual calendar comprising the one or more calendar events from all wireless devices of the group and the one or more private calendar events from the first wireless device.

17. The method of claim 16, wherein the calendar information received from the plurality of wireless devices further comprises one or more private calendar events from each wireless device of the group, further comprising:

maintaining a plurality of individual calendars, each individual calendar corresponding to one wireless device of the group, wherein each individual calendar comprises the calendar events from all wireless devices of the group and the one or more private calendar events from the corresponding wireless device; and providing access to each individual calendar only to the corresponding wireless device.

18. The method of claim 16, further comprising:

providing equal access to each of the plurality of wireless devices to modify the group calendar.

19. The method of claim 18, further comprising:

authenticating each wireless device prior to providing access to each individual calendar.

20. The method of claim 12, further comprising:

receiving, from one of the wireless devices, a command to modify content of the group calendar;

modifying the group calendar according to the command; and providing access to the modified group calendar to the plurality of wireless devices.

21. The method of claim 12, further comprising:

providing access only to the first wireless device to modify the individual calendar.

22. An apparatus comprising:

a processor configured to communicate with a server, the processor configured to perform:

transmitting calendar information to the server, the calendar information comprising one or more calendar events and one or more private calendar events;

accessing a group calendar maintained on the server for a group including the apparatus and a plurality of wireless devices, the group calendar comprising the one or more calendar events and one or more additional calendar events from one or more wireless devices of the group;

accessing an individual calendar maintained on the server and accessible only by the apparatus, the individual calendar comprising the one or more calendar events, the one or more additional calendar events, and the one or more private calendar events, and displaying, on a graphical user interface, the one or more calendar events, the one or more additional calendar events, and the one or more private calendar events, wherein each additional calendar event is marked with a graphical indicator corresponding to the wireless device from which the calendar event was received, and each calendar event and each private calendar event is marked with a graphical indicator corresponding to the apparatus.

23. The apparatus of claim 22, wherein the processor is further configured to perform:

accessing the server to modify the group calendar; and accessing the server to modify the individual calendar.

24. The apparatus of claim 22, wherein the processor is configured for communication with the server through communication with an access point in communication with the server.

25. The apparatus of claim 22, wherein the processor is further configured to perform:

transmitting authentication information to the server for authentication of the apparatus prior to accessing the individual calendar.

26. The apparatus of claim 22, wherein the processor is further configured to perform:

transmitting, to the server, a command to modify content of the group calendar; and accessing the modified group calendar.

27. The apparatus of claim 22, wherein the processor is further configured to perform:
   accessing a group notice board maintained on the server, the group notice board comprising at least some of the calendar information.

28. The apparatus of claim 22, wherein the processor is further configured to perform:
   creating each of the one or more calendar events and each of the one or more private calendar events by entry into a new calendar event view.

29. A method comprising:
   transmitting calendar information to a server from a first device, the calendar information comprising one or more calendar events and one or more private calendar events;
   accessing a group calendar maintained on the server for a group including the first device and a plurality of wireless devices, the group calendar comprising the one or more calendar events and one or more additional calendar events from the wireless devices of the group;
   accessing an individual calendar maintained on the server and accessible only by the first device, the individual calendar comprising the one or more calendar events, the one or more additional calendar events, and the one or more private calendar events; and
   displaying, on a graphical user interface associated with the first device, the one or more calendar events, the one or more additional calendar events, and the one or more private calendar events, wherein each additional calendar event is marked with a graphical indicator corresponding to the wireless device from which the calendar event was received, and each calendar event and each private calendar event is marked with a graphical indicator corresponding to the first device.

30. The method of claim 29, further comprising:
   accessing the server to modify the group calendar; and
   accessing the server to modify the individual calendar.

31. The method of claim 29, wherein the calendar information is transmitted through an access point in communication with the server.

32. The method of claim 29, further comprising:
   transmitting authentication information from the first device to the server for authentication prior to accessing the individual calendar.

33. The method of claim 29, further comprising:
   transmitting, from the first device to the server, a command to modify content of the group calendar; and
   accessing the modified group calendar.

34. The method of claim 29, further comprising:
   accessing a group notice board maintained on the server, the group notice board comprising at least some of the calendar information.

35. The method of claim 29, further comprising:
   creating each of the one or more calendar events and each of the one or more private calendar events by entry into a new calendar event view.

36. A tangible machine-readable storage medium containing machine-executable code comprising instructions configured to cause one or more processors to perform:
   transmitting calendar information to a server from a first device, the calendar information comprising one or more calendar events and one or more private calendar events;
   accessing a group calendar maintained on the server for a group including the first device and a plurality of wireless devices, the group calendar comprising the one or more calendar events and one or more additional calendar events from the wireless devices of the group;
   accessing an individual calendar maintained on the server and accessible only by the first device, the individual calendar comprising the one or more calendar events, the one or more additional calendar events, and the one or more private calendar events; and
   displaying, on a graphical user interface, the one or more calendar events, the one or more additional calendar events, and the one or more private calendar events, wherein each additional calendar event is marked with a graphical indicator corresponding to the wireless device from which the calendar event was received, and each calendar event and each private calendar event is marked with a graphical indicator corresponding to the first device.

37. The tangible machine-readable storage medium of claim 36, wherein the instructions are further configured to cause the one or more processors to perform:
   accessing the server to modify the group calendar; and
   accessing the server to modify the individual calendar.

38. The tangible machine-readable storage medium of claim 36, wherein the calendar information is transmitted through an access point in communication with the server.

39. The tangible machine-readable storage medium of claim 36, wherein the instructions are further configured to cause the one or more processors to perform:
   transmitting authentication information from the first device to the server for authentication prior to accessing the individual calendar.

40. The tangible machine-readable storage medium of claim 36, wherein the instructions are further configured to cause the one or more processors to perform:
   transmitting, from the first device to the server, a command to modify content of the group calendar; and
   accessing the modified group calendar.

41. The tangible machine-readable storage medium of claim 36, wherein the instructions are further configured to cause the one or more processors to perform:
   accessing a group notice board maintained on the server, the group notice board comprising at least some of the calendar information.

42. The tangible machine-readable storage medium of claim 36, wherein the instructions are further configured to cause the one or more processors to perform:
   creating each of the one or more calendar events and each of the one or more private calendar events by entry into a new calendar event view.

43. The tangible machine-readable storage medium of claim 36, wherein each graphical indicator comprises a different display color.

44. The method of claim 29, wherein each graphical indicator comprises a different display color.

45. The apparatus of claim 22, wherein each graphical indicator comprises a different display color.

46. An apparatus comprising:
   a processor configured to communicate with a server, the processor configured to perform:
   transmitting calendar information to the server, the calendar information comprising one or more calendar events and one or more private calendar events;
   accessing a group calendar maintained on the server for a group including the apparatus and a plurality of wireless devices, the group calendar comprising the one or more calendar events and one or more additional calendar events from one or more wireless devices of the group;

accessing an individual calendar maintained on the server and accessible only by the apparatus, the individual calendar comprising the one or more calendar events, the one or more additional calendar events, and the one or more private calendar events; and displaying, on a graphical user interface, the one or more calendar events, the one or more additional calendar events, and the one or more private calendar events, wherein the graphical user interface comprises a first screen area configured for displaying a monthly display bar allowing for selection of any specific day or week of a selected month and a second screen area configured for alternately displaying at least a weekly calendar event view corresponding to a specific week selected from the monthly display bar or a daily calendar event view corresponding to a specific day selected from the monthly display bar, wherein the weekly calendar event view displays any of the one or more calendar events, the one or more additional calendar events, and the one or more private calendar events occurring within the specific selected week, and wherein the daily calendar event view displays any of the one or more calendar events, the one or more additional calendar events, and the one or more private calendar events occurring within the specific selected day.

47. The apparatus of claim 46, wherein the processor is further configured to perform:

accessing the server to modify the group calendar; and accessing the server to modify the individual calendar.

48. The apparatus of claim 46, wherein the processor is further configured to perform:

transmitting authentication information to the server for authentication of the apparatus prior to accessing the individual calendar.

49. A method comprising:

transmitting calendar information to a server from a first device, the calendar information comprising one or more calendar events and one or more private calendar events;

accessing a group calendar maintained on the server for a group including the first device and a plurality of wireless devices, the group calendar comprising the one or more calendar events and one or more additional calendar events from the wireless devices of the group;

accessing an individual calendar maintained on the server and accessible only by the first device, the individual calendar comprising the one or more calendar events, the one or more additional calendar events, and the one or more private calendar events; and displaying, on a graphical user interface associated with the first device, the one or more calendar events, the one or more additional calendar events, and the one or more private calendar events, wherein the graphical user interface comprises a first screen area configured for displaying a monthly display bar allowing for selection of any specific day or week of a selected month and a second screen area configured for alternately displaying at least a weekly calendar event view corresponding to a specific week selected from the monthly display bar or a daily calendar event view corresponding to a specific day selected from the monthly display bar, wherein the weekly calendar event view displays any of the one or more calendar events, the one or more additional calendar events, and the one or more private calendar events occurring within the specific selected week, and wherein the daily calendar event view displays any of the one or more calendar events, the one or more additional calendar events, and the one or more private calendar events occurring within the specific selected day.

50. The method of claim 49, further comprising:

accessing the server to modify the group calendar; and accessing the server to modify the individual calendar.

51. The method of claim 49, further comprising:

transmitting authentication information from the first device to the server for authentication prior to accessing the individual calendar.

* * * * *